United States Patent
Noguchi

(10) Patent No.: US 7,801,160 B2
(45) Date of Patent: Sep. 21, 2010

(54) COMMUNICATION APPARATUS AND DATA TRANSMISSION METHOD THEREOF

(75) Inventor: Yoshihiro Noguchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 128 days.

(21) Appl. No.: 12/119,635

(22) Filed: May 13, 2008

(65) Prior Publication Data

US 2008/0285554 A1    Nov. 20, 2008

(30) Foreign Application Priority Data

May 14, 2007    (JP) ............................. 2007-127798

(51) Int. Cl.
*H04L 12/56* (2006.01)

(52) U.S. Cl. ....................... 370/401; 370/230; 370/231; 370/252

(58) Field of Classification Search ................. 370/352, 370/230, 231, 252, 401; 709/219, 228, 206, 709/227; 358/1.15
See application file for complete search history.

(56) References Cited

U.S. PATENT DOCUMENTS 7,369,493 B2 * 5/2008 Ibezim et al. ............... 370/230

| | | | |
|---|---|---|---|
| 2002/0154657 A1 | 10/2002 | Takagi et al. | |
| 2003/0187658 A1* | 10/2003 | Selin et al. | 704/270.1 |
| 2004/0230659 A1* | 11/2004 | Chase | 709/206 |
| 2006/0034336 A1* | 2/2006 | Huh et al. | 370/498 |
| 2006/0268839 A1* | 11/2006 | Kato | 370/352 |
| 2007/0291301 A1* | 12/2007 | Ozawa et al. | 358/1.15 |
| 2009/0119389 A1* | 5/2009 | Mu et al. | 709/219 |
| 2009/0164645 A1* | 6/2009 | Sylvain | 709/228 |

FOREIGN PATENT DOCUMENTS

JP    2005-150830    6/2005

OTHER PUBLICATIONS

English language Abstract of JP 2005-150830.

* cited by examiner

*Primary Examiner*—William Trost, IV
*Assistant Examiner*—Emmanuel Maglo
(74) *Attorney, Agent, or Firm*—Greenblum & Bernstein, P.L.C.

(57) ABSTRACT

An IP communication apparatus has a file transferer that transfers a media data file to a destination apparatus, when determining that the destination apparatus has the file transfer function, based on transmission and reception of SIP messages to and from a call controller, which transmits and receives SIP messages to and from the destination apparatus via a call connection server. Thereby, the IP communication apparatus allows an easy transfer of the media data file.

8 Claims, 13 Drawing Sheets

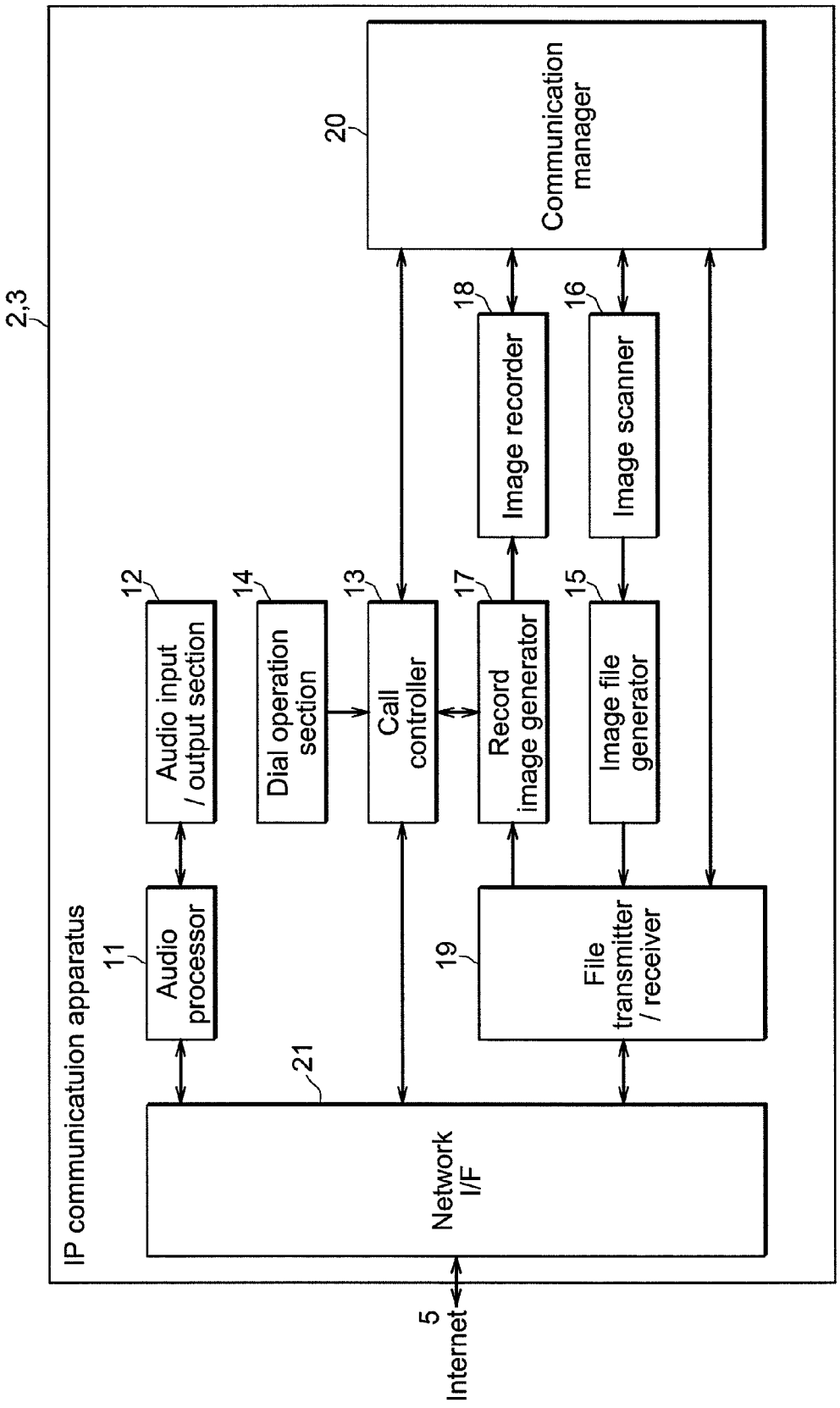

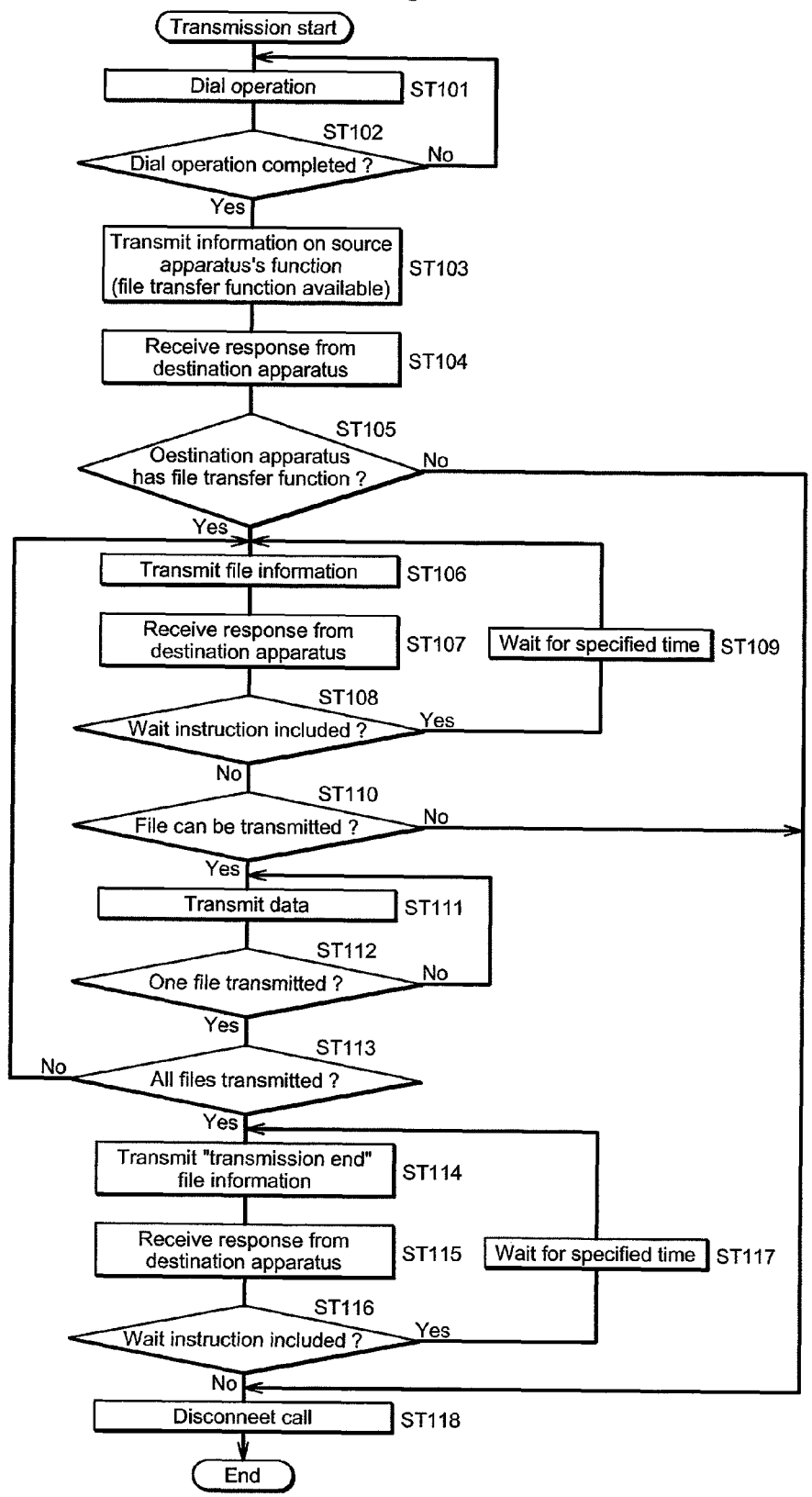

```
INVITE sip:123456@192.168.20.10 SIP/2.0
Max-Forwards: 70
To: sip:123456@192.168.20.10
From: sip:123456@192.168.20.10;tag=3447165558
Call-ID: d793b011-7348bd9dc8ee1371ca940080f082399c@192.168.20.20
CSeq: 1 INVITE
Contact: <sip:123456789@192.168.20.20:5060;user=phone;transport=udp>
Content-Type: application/sdp
Content-Length: 281
v=0
o=- 1167609649 1167609649 IN IP4 192.168.20.20
s=SIP-FAX
c=IN IP4 192.168.20.20
t=0 0
m=audio 16000 RTP/AVP 0 2 18
a=rtpmap:0 PCMU/8000
a=rtpmap:2 G726-32/8000           }32
a=rtpmap:18 G729A/8000
a=sendrecv
m=file 54111 TCP 120
a=FileMaxSize:32000               }33
a=TransferPacketSize:1540
```
}31

```
SIP/2.0 200 OK
To: sip:123456@192.168.20.10
From: sip:123456@192.168.20.10;tag=3447165558
Call-ID: d793b011-7348bd9dc8ee1371ca940080f082399c@192.168.20.20
CSeq: 1 INVITE
Contact: sip:123456789@192.168.20.20:5060
Content-Type: application/sdp
Content-Length: 165
v=0
o=- 1167609649 1167609649 IN IP4 192.168.20.20
s=SIP-FAX
c=IN IP4 192.168.20.20
t=0 0
m=file 54111 TCP 120
a=FileMaxSize:16000     }35
a=TransferPacketSize:1540
```
}34

```
v=0
o=- 1167609649 1167609649 IN IP4 192.168.20.20
s=SIP-FAX
c=IN IP4 192.168.20.20
t=0 0
m=file 54111 TCP 120
a=FileMaxSize:16000
a=TransferPacketSize:1540
a=filename:page1.tif
a=filesize:2300
a=condition:sendenable
```
41
42

```
v=0
o=- 1167609649 1167609649 IN IP4 192.168.20.20
s=SIP-FAX
c=IN IP4 192.168.20.20
t=0 0
m=file 54111 TCP 120
a=FileMaxSize:16000
a=TransferPacketSize:1540
a=filename:page1.tif
a=filesize:2300
a=condition:sendenable
```
43
44

```
v=0
o=- 1167609649 1167609649 IN IP4 192.168.20.20
s=SIP-FAX
c=IN IP4 192.168.20.20
t=0 0
m=file 54111 TCP 120
a=FileMaxSize:16000
a=TransferPacketSize:1540
a=filename:page2.tif
a=filesize:2100
a=condition:sendenable
```

```
v=0
o=- 1167609649 1167609649 IN IP4 192.168.20.20
s=SIP-FAX
c=IN IP4 192.168.20.20
t=0 0
m=file 54111 TCP 120
a=FileMaxSize:16000
a=TransferPacketSize:1540
a=filename:page2.tif
a=filesize:2100
a=condition:wait2000
```

```
                                                    M1101
v=0
o=- 1167609649 1167609649 IN IP4 192.168.20.20
s=SIP-FAX
c=IN IP4 192.168.20.20                                  } 61
t=0 0
m=file 54111 TCP 120
a=FileMaxSize:16000
a=TransferPacketSize:1540   } 62
a=filename:
a=filesize:0
a=condition:sendclose
```

Fig.11B

```
                                                    M1102
v=0
o=- 1167609649 1167609649 IN IP4 192.168.20.20
s=SIP-FAX
c=IN IP4 192.168.20.20                                  } 63
t=0 0
m=file 54111 TCP 120
a=FileMaxSize:16000
a=TransferPacketSize:1540   } 64
a=filename:
a=filesize:0
a=condition:wait2000
```

COMMUNICATION APPARATUS AND DATA TRANSMISSION METHOD THEREOF

CROSS-REFERENCE TO RELATED APPLICATIONS

The present application claims priority under 35 U.S.C. §119 of Japanese Application No. 2007-127798 filed on May 14, 2007, the disclosure of which is expressly incorporated by reference herein in its entirety.

BACKGROUND OF THE INVENTION

1. Field of the Invention

The present invention relates to a communication apparatus that performs communication over an IP (Internet Protocol) network and a data transmission method of the communication apparatus.

2. Description of Related Art

Conventionally known methods of facsimile communication via a network, such as the Internet and the like, include a method for transmitting image data as a file attached to e-mail based on SMTP (Simple Mail Transfer Protocol) (ITU-T T.37 standard); a method for transmitting packetized G3 facsimile modem signals on a real-time basis (ITU-T T.38 standard); and a method for transmitting G3 facsimile modem signals as they are as audio signals (pass-through method). While being able to ensure a highly reliable communication, however, the T.37 standard is inferior in real-time performance. Meanwhile, the T.38 standard, which has a superior real-time performance, is complex in processing since the standard follows ITU-T T.30 procedures. Further, the pass-through method is highly versatile since the method handles modem signals as if they are audio signals, but communication may be unstable as being affected by packet loss, delay, and the like.

Recently, SIP (Session Initiation Protocol) is used as a signaling protocol in IP telephones, video-phones, and the like. SIP enables transmission and reception of audio, image, video, and the like in a relatively simple process while maintaining the real-time performance. As technology of this type, a data transfer apparatus is known, for example, in which two apparatuses that exchange the capability with each other, in a call control process, via the SIP messages containing the capability information including the type of the codec and the like of a source apparatus is added, and then transfer audio, image, and the like in a communication process (Refer to Related Art 1).

[Related Art 1] Japanese Patent Laid-open Publication No. 2005-150830

However, the conventional technology described in Related Art 1 above, which transmits and receives data based on RTP (Real-time Transport Protocol) prioritizing real-time performance, is lack in the communication stability. Further, the technology does not meet a request such as to handle received data as a file on a receiving side. In transmission and reception of image data, in particular, it is difficult to surely transmit a predetermined number of pages of facsimile images and output the images on the receiving side, as conventional G3 facsimile apparatuses do.

SUMMARY OF THE INVENTION

The present invention is provided to address the above-described problems in the conventional technology. A communication apparatus according to the present invention includes a call controller and a file transferer. The call controller transmits and receives a SIP message to and from a destination apparatus via a call connection server. The file transferer transfers a data file to the destination apparatus, when it is realized that the destination apparatus has a file transfer function by transmitting and receiving the SIP message.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2A is a function block diagram of the IP communication apparatus;

FIG. 3 is a flowchart illustrating operations of the IP communication apparatus to transmit a file;

FIGS. 8A and 8B illustrate details of a SIP message;

FIGS. 9A and 9B illustrate details of a SIP message;

FIGS. 10A and 10B illustrate details of a SIP message;

FIGS. 11A and 11B illustrate details of a SIP message; and

DETAILED DESCRIPTION OF PREFERRED EMBODIMENTS

Figure 1:
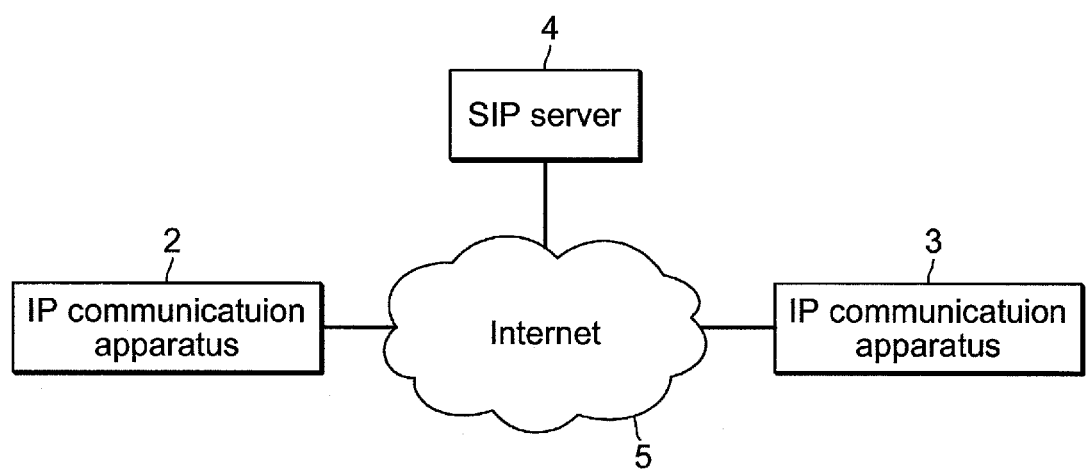
FIG. 1 is a configuration diagram of an IP communication system that includes an IP communication apparatus according to the present invention.

A first aspect of the present invention provides an IP communication apparatus that includes a call controller, a memory, and a file transferer, the IP communication apparatus being connected to a call connection server and a destination apparatus over an IP network. The call controller transmits and receives a SIP message to and from the destination apparatus via the call connection server. The memory stores a media data file. The file transferer transfers the media data file to the destination apparatus, when it is determined, from transmission and reception of the SIP message, that the destination apparatus has a file transfer function.

The configuration above allows IP communication apparatuses to easily transfer the media data (audio, text, image, video, and the like) file using SIP.

A second aspect of the present invention provides the IP communication apparatus that further includes a file transfer manager that manages transfer of the media data file. The file transfer manager causes the call controller to transmit to the destination apparatus, an INVITE message to which a transfer capability information of the media data file is added, as the SIP message.

The configuration above allows the destination apparatus to easily recognize the file transfer capability information of the IP communication apparatus. A file reception capability information of the destination apparatus can be recognized when the file reception capability information is added to a response (200OK) from the destination apparatus in response to the INVITE message.

A third aspect of the present invention provides the IP communication apparatus, wherein the file transfer manager causes the call controller to transmit to the destination apparatus, a re-INVITE message to which file information on the media data file that the file transferer transfers is added, as the SIP message.

The configuration above allows the destination apparatus to easily recognize the file information on the media data file to be transferred. Whether or not the media data file can be transferred can be determined when the file reception capability information is added to a response (200OK) from the destination apparatus in response to the re-INVITE message.

A fourth aspect of the present invention provides the IP communication apparatus, wherein the file information contains a file name and file size of the data file to be transmitted.

A fifth aspect of the present invention provides the IP communication apparatus, wherein the media data file contains image data corresponding to one page of a document, and the file transferer transfers the media data file on a file basis.

The configuration above allows the destination apparatus to receive, print, and save the image data per page, in a similar manner where conventional G3 facsimile apparatuses perform, thereby enhancing users' convenience. In addition, the memory capacity for temporary storage of the received image data before printing and the like can be relatively small in the destination apparatus, and thus cost reduction of the apparatus can be achieved.

A sixth aspect of the present invention provides an IP communication apparatus that includes a call controller, a file transferer, and a file transfer manager, the IP communication apparatus being connected to a call connection server and a destination apparatus over an IP network. The call controller transmits and receives a SIP message to and from the destination apparatus via the call connection server. The file transferer transfers a media data file to the destination apparatus, after a session is established with the destination apparatus through transmission and reception of the SIP message. The file transfer manager manages transfer of the media data file. The file transfer manager causes the call controller to transmit to the destination apparatus, an INVITE message to which a transfer capability information of the media data file is added as the SIP message; causes the call controller to transmit to the destination apparatus, a re-INVITE message to which file information on the media data file that the file transferer transfers is added as the SIP message, when a response is provided from the destination apparatus indicating that the apparatus has file transfer capability; and causes the file transferer to transfer the data file, when information indicating reception capability is received from the destination apparatus as a response to the re-INVITE message.

A seventh aspect of the present invention provides the IP communication apparatus, wherein when receiving information instructing wait from the destination apparatus, the IP communication apparatus temporarily stops transfer of the data file.

An eighth aspect of the present invention provides a data transmission method of an IP communication apparatus connected to a call connection server and a destination apparatus over an IP network. The data transmission method includes transmitting a SIP message to and received from the destination apparatus via the call connection server and transferring a media data file to the destination apparatus, when it is determined, from the SIP message transmitted and received in the call connection, that the destination apparatus has a file transfer function.

A ninth aspect of the present invention provides a data transmission method of an IP communication apparatus connected to a call connection server and a destination apparatus over an IP network. The data transmission method includes transmitting an INVITE message to which a transfer capability information of a media data file is added to the destination apparatus as a SIP message; transmitting a re-INVITE message to which a file information on the media data file is added to the destination apparatus as the SIP message, when the destination apparatus issues a response indicating that the apparatus has file transfer capability; and transferring the media data file, when information indicating reception capability is received from the destination apparatus as a response to the re-INVITE message.

A tenth aspect of the present invention provides the data transmission method, which comprises stopping transfer of the media data file temporality, when information instructing wait is received from the destination apparatus.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The embodiments of the present invention are explained in the following, with reference to the above-described drawings.

FIG. 1 is a configuration diagram of an IP communication system that includes an IP communication apparatus according to the present embodiment. IP communication system 1 includes a plurality of IP communication apparatuses 2 and 3 and SIP server (call connection server) 4, which are mutually connected via the Internet (IP network) 5.

IP communication apparatuses 2 and 3 function as a UAC (User Agent Client) of SIP (Session Initiation Protocol). IP communication apparatuses 2 and 3 transmit to and receive from each other SIP messages via SIP server 4 in a call control process so as to establish a session. In a communication process thereafter, the IP communication apparatuses transfer media data (audio, text, image, video, and the like). As described hereinafter, a function to transfer the media data (hereinafter referred to as "file transfer function") is characteristic in that the media data are sure to be transmitted and received on a file basis. The function allows an easy transfer of media data files using SIP.

SIP server 4 functions as a UAS (User Agent Server) of SIP. In response to a request from IP communication apparatuses 2 and 3, SIP server 4 provides a proxy server function that relays a SIP message for call connection between the apparatuses; and a registrar function that manages (i.e., registers in, updates on, deletes from a location server, and the like) information, such as, global addresses, port numbers, NAT types, and the like, associated with IP communication apparatuses 2 and 3.

Figure 2B:
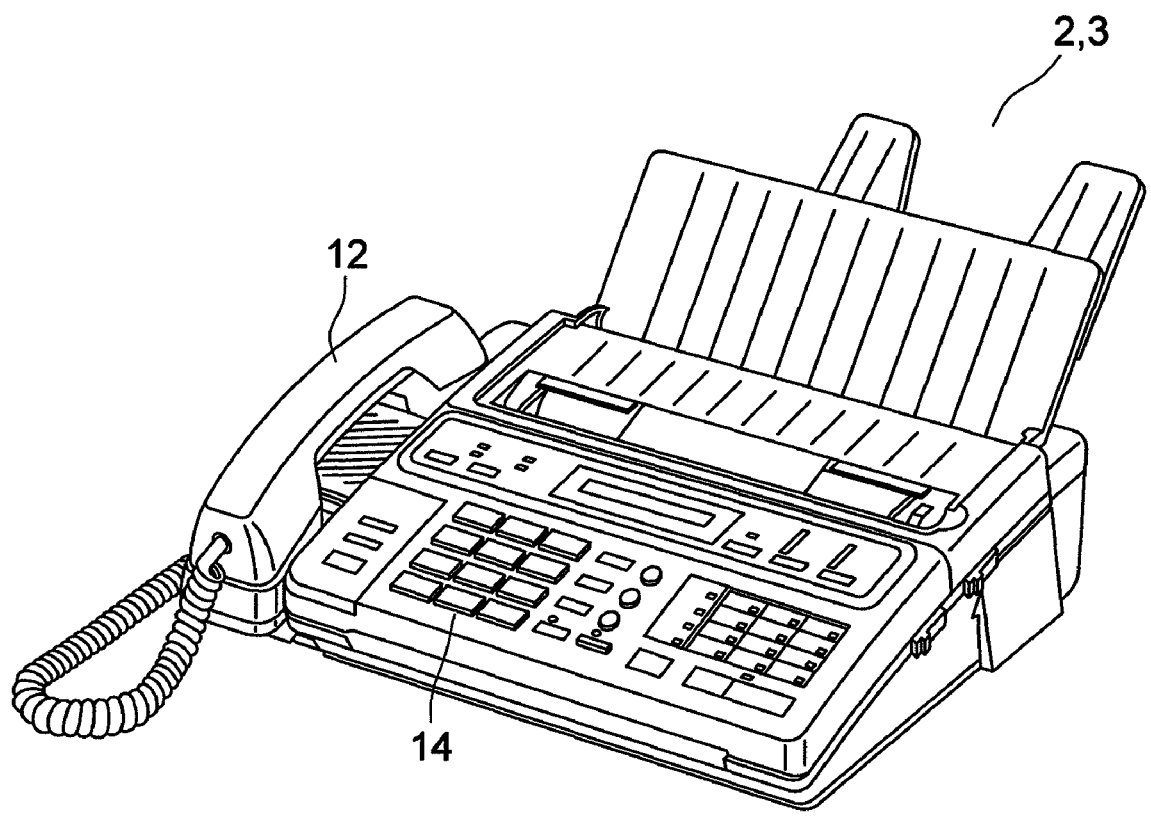
FIG. 2B is a perspective view of the IP communication apparatus.

FIG. 2A is a function block diagram of the IP communication apparatus shown in FIG. 1. The figure shows a configuration in which IP communication apparatuses 2 and 3 transmit and receive image data as media data.

IP communication apparatuses 2 and 3 have audio processor 11, audio input/output section 12, call controller 13, dial operation section 14, image file generator 15, image scanner 16, recording image generator 17, image recorder 18, file transmitter/receiver (file transferer) 19, and communication manager (file transfer manager) 20.

Audio processor 11 performs a process related to a voice communication executed with a destination apparatus based on VoIP (Voice over Internet Protocol). Audio processor 11 has A/D and D/A conversion functions for transmitted and received data, and an audio codec function based on a predetermined audio encoding method (e.g., ITU-T recommendation G.711, G.729, and the like). Audio processor 11 A/D converts analog signals into digital data and encodes the data for transmission, the analog signals being input from audio input/output section 12 that includes a voice transmitter/receiver. Audio processor 11 also decodes and D/A converts received encoded data so as to generate analog signals, and outputs the signals to audio input/output section 12.

Call controller 13 performs a signaling process for establishing a session while exchanging SIP messages with the destination apparatus via SIP server 4, in accordance with user's operation on dial operation section 14.

Image file generator 15 generates a file for transmission from image data, which image scanner 16 generates by optically scanning an image on an original document. When the original document contains a plurality of pages, a plurality of files are generated per page of the document. The files are assigned with the file-name such as, page 1.tif, page2.tif, and the like, for example, and stored in a memory (not shown in the figure) of image file generator 15. Recording image generator 17 generates image data for recording from a file (image data) received from the destination apparatus. Image recorder 18 forms an image on a recording paper based on the recorded image data.

File transmitter/receiver 19 packetizes the media data generated as a file, and performs a transmission/reception process. In the communication process, file transmitter/receiver 19 confirms reception, overlap, missing and the like of the data, based on TCP (Transmission Control Protocol), so as to ensure a high reliability similar to communication by conventional G3 facsimile apparatuses.

Communication manager 20 manages media data file transfer. As described hereinafter, communication manager 20 exchanges with the destination apparatus, capability information associated with the file transfer function (e.g., availability of the file transfer function, maximum processable file size, and packet size) and file information of a file to be transferred (e.g., file name, file format, and file size), using an SDP (Session Description Protocol) description document in a SIP message. Communication manager 20 further provides a wait instruction so as to cause the destination apparatus to wait (temporarily stop communication) in accordance to the status of the media data reception and processing thereof on the source apparatus. Communication manager 20 exchanges the wait instruction information (e.g., wait time) with the destination apparatus using the SDP description document in the SIP message, similar to the process above. Communication manager 20 also performs a process so as to cause the source apparatus to wait according to a wait instruction from the destination apparatus.

Network I/F 21 is connected to the Internet 5 via a LAN and the like (not shown in the figure), in order to transmit to and receive from the destination apparatus, a SIP message and a media data packet, based on a predetermined communication protocol. In the present embodiment, the SIP message is exchanged pursuant to SIP, and the media data packet is exchanged pursuant to TCP. It is possible, however, that the media data packet is exchanged pursuant to UDP.

With the configuration above, IP communication apparatuses 2 and 3 realize a voice communication function, similar to known IP telephone apparatuses, as well as the file transfer function, in which a transmitting apparatus transfers an image data file (e.g., JPEG, TIFF, BMP, and the like) to a receiving apparatus using SIP, similar to conventional G3 facsimile apparatuses. In explanations below on details of the file transfer function of the transmitting and receiving apparatuses, IP communication apparatus 2 serves as an apparatus to transmit a file (transmitting apparatus), and IP communication apparatus 3 as an apparatus to receive a file (receiving apparatus).

FIG. 3 is a flowchart illustrating operations of the IP communication apparatus to transmit a file to a destination apparatus.

A user first enters a destination number of the destination apparatus (receiving apparatus) from dial operation section 14 (ST 101). When the dial operation is properly completed (ST 102: Yes), communication manager 20 adds to a SIP message, capability information on the file transfer function of the source apparatus; and then, call controller 13 transmits to the destination apparatus the SIP message to which the capability information is added. When adding a variety of information to the SIP message, communication manager 20 describes necessary information to a message body of the SIP message as an SDP description document. When receiving a response to the SIP message (ST 104), IP communication apparatus 2 determines whether or not the destination apparatus has the file transfer function, based on information included in a message body of the response message (ST 105).

When determining that the destination apparatus does not have the file transfer function, IP communication apparatus 2 disconnects the call (ST 118). Conversely, when IP communication apparatus 2 determines that the destination apparatus has the file transfer function, communication manager 20 adds to a SIP message, file information of a file to be transferred, including file name, file size, and the like; and then, call controller 13 transmits to the destination apparatus, the SIP message to which the file information is added (ST 106). Files for transmission are a file scanned by image scanner 16 and generated by image generator 15, and a file generated on another apparatus and recorded on a storage medium, such as an SD card and the like. However, the files are not limited to those kinds. Subsequently, when receiving a response to the SIP message (ST 107), IP communication apparatus 2 determines whether or not a message body thereof includes wait instruction information (ST 108). When determining that the wait instruction information is included, IP communication apparatus 2 stops communication for a specified time (ST 109) and returns to ST 106 again. The destination apparatus can add to the response message in ST 107, information indicating whether or not file transfer is accepted. The destination apparatus rejects file transfer, when, for example, a memory capacity (or remaining capacity) thereof is so small relative to a size of a file to be transmitted that the destination apparatus cannot receive the file.

Then, when IP communication apparatus 2 determines that the file can be transmitted based on the response message in ST 107 (ST 110: Yes), file transmitter/receiver 19 starts file data transmission following TCP packet procedures (ST 111). More specifically, the file data are transferred to a TCP transmission socket I/F of a network stack, so that data transmission is performed pursuant to TCP. When completing transmission of one file (ST 112: Yes), IP communication apparatus 2 determines whether or not transmission of all files is completed (ST 113). When determining that there is a file that has not been transmitted (ST 113: No), IP communication apparatus 2 returns to ST 106 again. For instance, IP communication apparatus 2 determines that file transmission is completed, when there is no more paper in a transmission paper tray of image scanner 16, or when a storage medium, such as an SD card and the like, contains no more file to be transmitted.

When IP communication apparatus 2 determines that all files were transmitted (ST 113: Yes), communication manager 20 transmits to the destination apparatus, a SIP message to which "transmission end" is added as the file information (ST 114). When receiving a response to the SIP message (ST 115), IP communication apparatus 2 determines whether or not a message body thereof includes wait instruction information (ST 116). When determining that the wait instruction information is included, IP communication apparatus 2 stops communication for a specified time (ST 117), similar to ST 109, and returns to ST 114 again so as to transmit to the destination apparatus, the SIP message to which "transmission end" is added as the file information.

Even when the "transmission end" information is transmitted, not file data, the wait instruction is provided in a case where the destination apparatus has yet to complete outputting previous recorded file data due to insufficient record processing capability of image recorder 18.

When determining that no wait instruction is provided in ST 116, IP communication apparatus 2 disconnects the call (ST 118) and ends the file transmission operations.

When determining in ST 105 that the destination apparatus does not have the file transfer function, or when determining in ST 110 that the file cannot be transmitted, IP communication apparatus 2 may execute a process to switch to voice communication, instead of executing call disconnection of ST 118.

Figure 4:
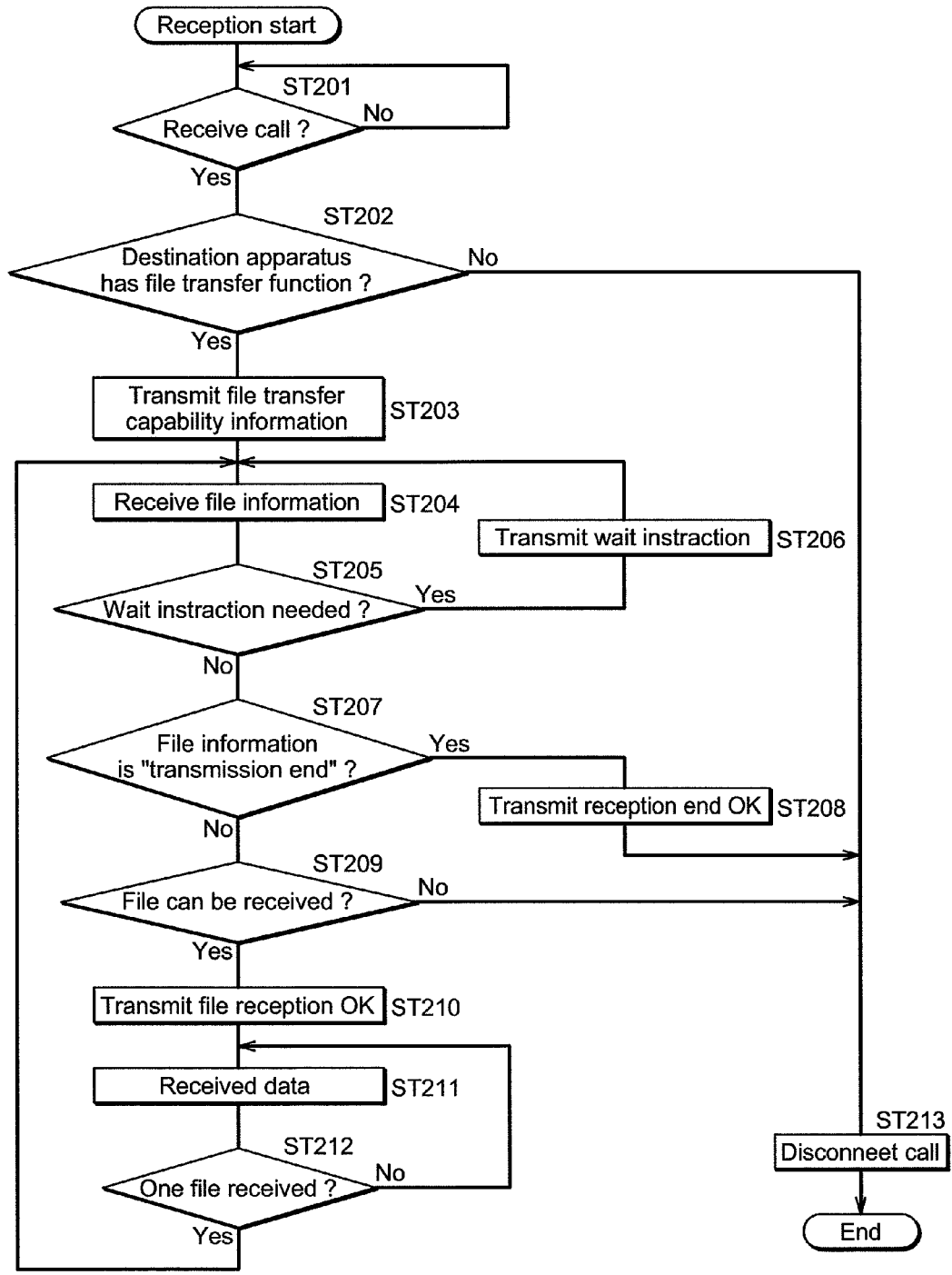
FIG. 4 a flowchart illustrating operations of the IP communication apparatus to receive a file.

FIG. 4 is a flowchart illustrating operations of the IP communication apparatus to receive a file from a destination apparatus.

When IP communication apparatus 3 receives a call from the destination apparatus (transmitting apparatus) (ST 201: Yes), communication manager 20 determines whether or not the destination apparatus has the file transfer function, based on information added to a received SIP message (ST 202). When determining that the destination apparatus does not have the file transfer function, IP communication apparatus 3 disconnects the call (ST 214). Conversely, when determining that the destination apparatus has the file transfer function, communication manager 20 adds to a SIP message, file transfer capacity information (including information indicating that file reception is accepted) of the source apparatus; and then, call controller 13 transmits to the destination apparatus the SIP message to which the capacity information is added (ST 203).

Subsequently, when IP communication apparatus 3 receives a SIP message to which transferred file information is added (ST 204), communication manager 20 determines, based on the obtained file information, whether or not to cause the destination apparatus to wait (e.g., whether or not to stop communication because of insufficient record processing capacity of image recorder 18) (ST 205). When determining that it is necessary to cause the destination apparatus to wait, communication manager 20 sets a wait time; call controller 13 transmits to the destination apparatus, a SIP message to which wait instruction information that includes the wait time is added (ST 206); and IP communication apparatus 3 returns to ST 204 again. Even when the obtained file information is "transmission end" indicating that transmission of all files is completed, there might be a case where the wait instruction is determined necessary in ST 204 depending on a record processing status of image recorder 18.

When determining that no wait instruction is needed (ST 205: No) and the file information received in ST 204 is "transmission end" indicating that transmission of all files is completed (ST 207: Yes), IP communication apparatus 3 transmits to the destination apparatus, a SIP message to which information is added indicating that reception ends (ST 208), disconnects the call (ST 213), and ends the file reception operations.

When the file information is not "transmission end" (ST 207: No), communication manager 20 determines whether or not a file can be received based on the SIP message information (ST 209). When determining that the file cannot be received, IP communication apparatus 3 disconnects the call (ST 213). Conversely, when determining that the file can be received, IP communication apparatus 3 transmits to the destination apparatus, a SIP message to which information is added indicating that the file can be received (ST 210) and starts reception of file data (ST 211).

When competing reception of one file (ST 212: Yes), IP communication apparatus 3 returns to ST 204 and receives from the destination apparatus, a SIP message to which information of a subsequent file is added.

When determining in ST 202 that the destination apparatus does not have the file transfer function, or when determining in ST 209 that the file cannot be received, IP communication apparatus 3 may execute a process to switch to voice communication, instead of executing the call disconnection of ST 213.

Figure 5:
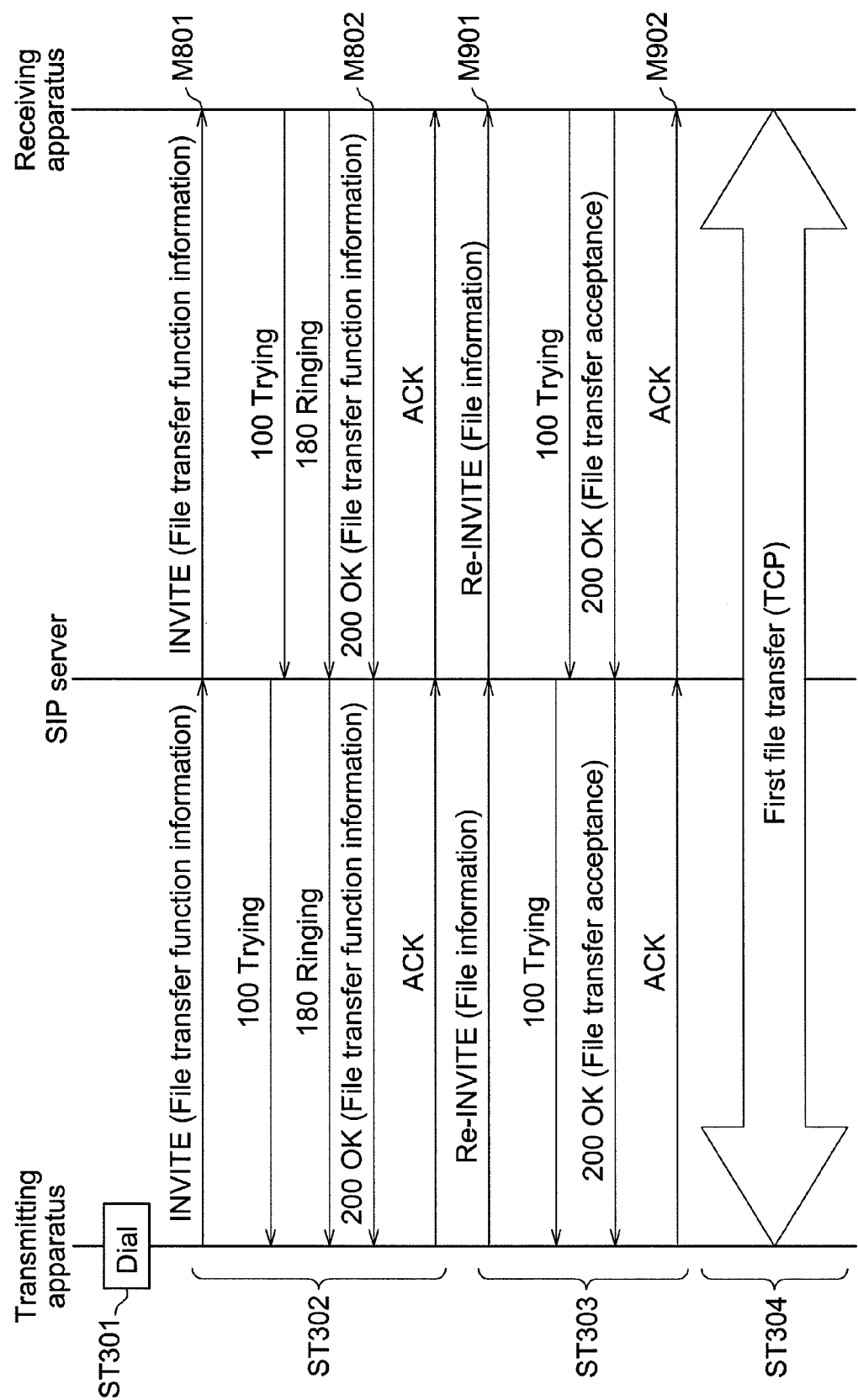
FIG. 5 is a sequence diagram illustrating a communication process in the IP communication system.
Figure 6:
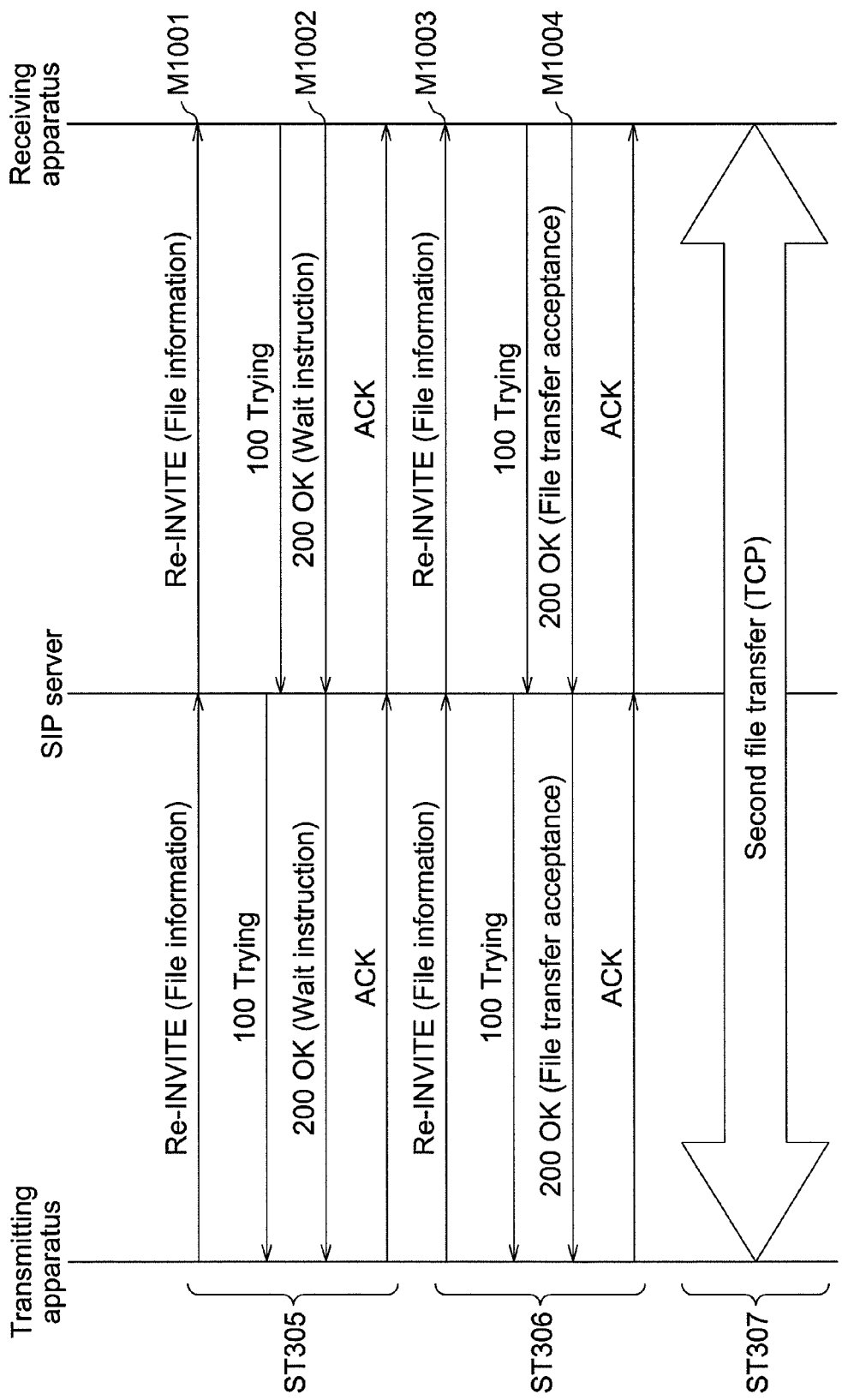
FIG. 6 is a sequence diagram illustrating a communication process in the IP communication system.
Figure 7:
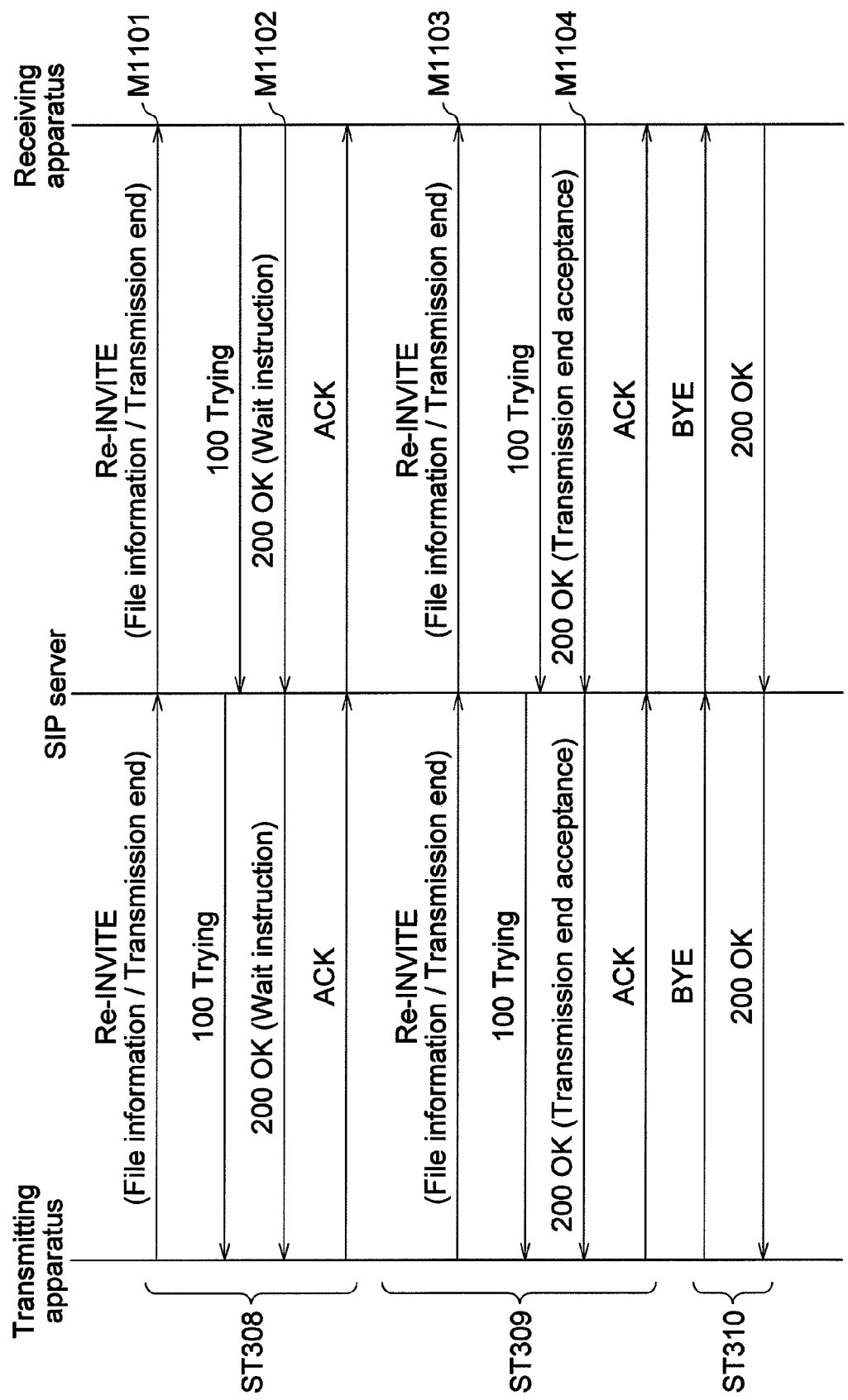
FIG. 7 is a sequence diagram illustrating a communication process in the IP communication system.

FIGS. 5 to 7 are sequence diagrams illustrating communication processes in the IP communication system shown in FIG. 1. FIGS. 5 to 7 are a series of processes, in which FIG. 5 shows a process through transmission of a first file; FIG. 6 shows a process through transmission of a second file; and FIG. 7 shows a process to end communication after file transmission is completed. Details of SIP messages transferred in the processes of FIGS. 5 to 7 are illustrated in FIGS. 8A to 12. In the SIP messages in FIGS. 9A to 12, only a message body is shown, excluding a start line and a header section.

In FIG. 5, the transmitting apparatus first dials the destination number of the receiving apparatus in order to place a call (ST 301). In this step, the transmitting apparatus transmits INVITE message M801 to start a session, and exchanges a series of SIP messages with the receiving apparatus through the SIP server (ST 302). Although not shown in the drawing, the transmitting and receiving apparatuses transmit a Register message to the SIP server when the power is supplied to the apparatuses, and perform a registration process with the SIP server in advance.

As shown in FIG. 8A, message body 31 of INVITE message M801 includes attribute information 32 associated with a media type "audio" and attribute information 33 associated with a media type "file." Including no attribute information associated with the media type "file" in message body 31 indicates that the transmitting apparatus has no file transfer function. By confirming an "m=file" description in message body 31, the receiving apparatus can recognize that the transmission apparatus has the file transfer function. Attribute information 33 contains file transfer capacity information. A maximum transmittable file size is indicated as "a=FileMaxSize:32000," which is 32000 bytes. A transmitted packet size is indicated as "TransferPacketSize:1540," which is 1540 bytes. Attribute information 33 is indicated as merely an exemplary embodiment of the file transfer function according to the present invention, and is not pursuant to standard technical specifications (RFC 2327 standard and the like).

Further, as shown in FIG. 8B, message body 34 of 200 OK message M802 includes attribute information 35, which is similar to attribute information 33 of INVITE message M801. Attribute information 35 allows the transmitting apparatus to recognize that the receiving apparatus has the file transfer function. In the figure, a maximum receivable file size is indicated as "a=FileMaxSize: 16000," which is 16000 bytes. The transmitting apparatus receives the information and sets a maximum file size to transmit to 16000 bytes (Refer to attribute information 42, which will be described in FIG. 9A hereinafter).

Subsequently, the transmitting apparatus transmits re-IN-VIVE message M901 for session change, and exchanges a series of SIP messages with the receiving apparatus via the SIP server (ST 303).

As shown in FIG. 9A, message body 41 of re-INVITE message M901 includes attribute information 42. Attribute information 42 contains transmitted file information: "a=filename:page1.tif," indicating that a transmitted file name (including an extension) is "page1.tif;" "a=filesize: 2300," indicating that a transmitted file size is 2300 bytes; and "a=condition:sendenable," indicating that the transmitting apparatus is capable of transmitting a file. By receiving re-INVITE message M901, the receiving apparatus can recognize attributes of the file that the transmitting apparatus is to transmit.

Further, as shown in FIG. 9B, message body 43 of 200 OK message M902 includes attribute information 44. Attribute information 44 contains file information identical to that of attribute information 42 in re-INVITE message M901. By receiving 200 OK message M902, the transmitting apparatus recognizes that the receiving apparatus has accepted a file transfer offer (re-INVITE message M901).

When a session is established through the communications above, the transmitting apparatus scans an original document, generates an image file to be transmitted, and then transmits the first image file (ST 304). Then, the receiving apparatus generates image data for recording from the first received file (including image data per page) and forms an image on a recording paper.

When completing transmission of the first image file, the transmitting apparatus subsequently transmits re-INVITE message M1001 for session change and exchanges a series of SIP messages with the receiving apparatus via the SIP server as shown in FIG. 6 (ST 305). In SIP, the re-INVITE message is used to change the first-connected media session still in progress. In the present embodiment, the re-INVITE message is used to change the media session so as to transmit a subsequent image file (e.g., page2.tif).

As shown in 10A, message body 51 of re-INVITE message M1001 includes attribute information 52. Similar to attribute information 42 of re-INVITE message M901, attribute information 52 contains information of a subsequently transmitted file (second file). In this case, the attribute information indicates that the file name is "page2.tif" and that the file size is 2100 bytes. By receiving re-INVITE message M1001, the receiving apparatus can recognize the information of the file that the transmitting apparatus transmits subsequently.

Further, as shown in FIG. 10B, message body 53 of 200 OK message M1002 includes attribute information 54. Attribute information 54 contains file information substantially identical to that of attribute information 52 in re-INVITE message M1001. Attribute information 54 is different, however, in that wait instruction information "a=condition:wait2000" is set.

The wait instruction information indicates that the receiving apparatus is currently incapable of receiving a file and that the transmitting apparatus needs to wait for two seconds. The transmitting apparatus, which receives 200 OK message M1002, stops communication for two seconds as specified by the receiving apparatus.

When the wait time elapses, the transmitting apparatus transmits again re-INVITE message M1003, which is identical to re-INVITE message M1001 in FIG. 10A, and exchanges a series of SIP messages with the receiving apparatus via the SIP server (ST 306). In this case, attribute information in 200 OK message M1004 contains file information identical to attribute information 52 in re-INVITE message M1001 (i.e., "a=condition:sendenable"). By receiving 200 OK message M1004, the transmitting apparatus recognizes that the receiving apparatus has accepted a file transfer offer.

When a session is established through the communications above, the transmitting apparatus transmits the second image file (ST 307). Then, the receiving apparatus generates image data for recording from the second received file and forms an image on a recording paper.

When completing transmission of the second image file, the transmitting apparatus subsequently transmits re-INVITE message M1101 (indicating "transmission end" in this example) for session change, and exchanges a series of SIP messages with the receiving apparatus via the SIP server as shown in FIG. 7 (ST 308).

As shown in FIG. 11A, message body 61 of re-INVITE message M1101 includes attribute information 62. Similar to attribute information 52 of re-INVITE message M1001, attribute information 62 contains information of a subsequently transmitted file. In attribute information 62, however, no file name is set ("a=filename:"); the file size is set to zero ("a=filesize:0"); and the transmitting apparatus is set to a state in which file transmission is completed ("a=condition:sendclose"). By receiving re-INVITE message M1101, the receiving apparatus can recognize attributes of the file that all files have been transferred.

Further, as shown in FIG. 11B, message body 63 of 200 OK message M1102 includes attribute information 64. Similar to attribute information 54 in above-described 200 OK message M1002, attribute information 64 contains the wait instruction information "a=condition:wait2000." The transmitting apparatus receives 200 OK message M1102 and stops communication for two seconds.

When the wait time elapses, the transmitting apparatus transmits again re-INVITE message M1103, which is identical to re-INVITE message M1101 in FIG. 11A, and exchanges a series of SIP messages with the receiving apparatus via the SIP server (ST 309). In this case, attribute information in 200 OK message M1104 contains file information identical to attribute information 62 in re-INVITE message M1101 (i.e., "a=condition:sendclose"). By receiving 200 OK message M1104, the transmitting apparatus recognizes that the receiving apparatus has accepted a file transfer offer.

When transmission of all files is finally completed, a communication to close the session is executed (ST 310).

As described above, transferring an image file on a page basis can relatively reduce the memory capacity for temporary storage before record processing in the receiving apparatus, thereby achieving cost reduction of the apparatus. Although a case where two files are transferred was explained in the present embodiment, the number of files to be transferred can be changed to any number.

Figure 12:
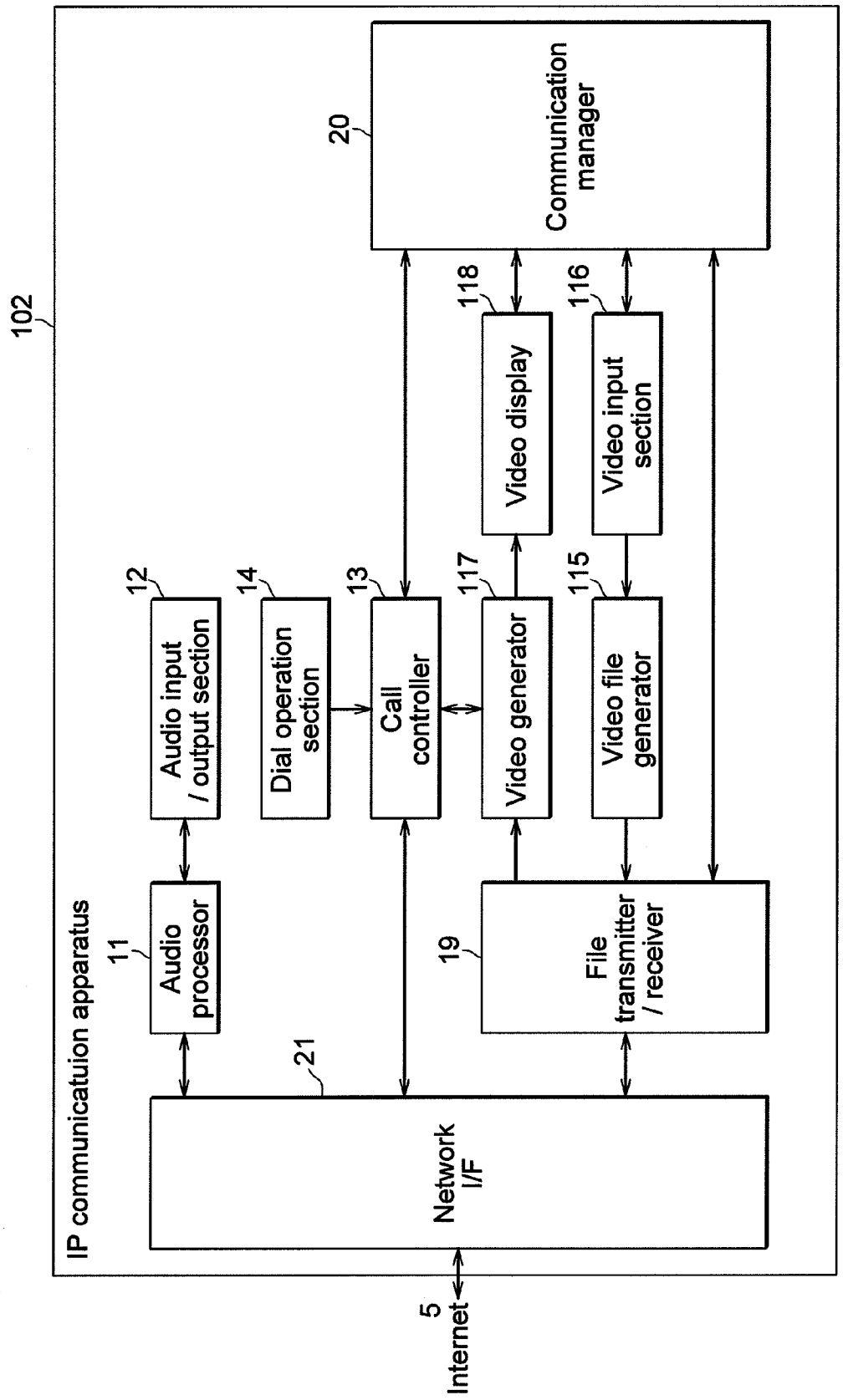
FIG. 12 is a function block diagram illustrating a modified example of the IP communication apparatus of FIG. 2A.

FIG. 12 is a function block diagram illustrating a modified example of the IP communication apparatus of FIG. 2A. The example herein shows a configuration for IP communication apparatus 102 to transmit and receive video data as media data. In FIG. 12, identical numerical references are provided to the configuration similar to IP communication apparatuses 2 and 3 in FIG. 2A, and explanations thereof are omitted.

In IP communication apparatus 102, video file generator 115 generates a file for transmission from video data generated by video input section 116, which has a video camera function. Video generator 117 generates video data for display from a file (video data) received from a destination apparatus. Based on the video data, video display 118 performs a process for displaying a video on a monitor screen and the like. The configuration above enables a file transfer function that transfers a video data file (e.g., MPEG, AVI, and the like) from a transmitting apparatus to a receiving apparatus using SIP. File transfer operations of IP communication apparatus 102 are similar to the above-described case of IP communication apparatuses 2 and 3 with reference to FIGS. 3 to 7.

The present invention is explained in detail based on a particular embodiment, which is construed as an exemplary embodiment, but not a limiting example. For example, the media data transferable with the file transfer function are not limited to the above-described image and video, but may include an audio file (e.g., PCM, MP3, and the like) and a file used on PC (e.g., text, PDF, and the like).

The IP communication apparatus according to the present invention and the data transmission method thereof allow an easy transfer of a media data (audio, text, image, video, and the like) file between IP communication apparatuses using SIP, and thus are effective as an IP communication apparatus that performs communications over an IP network and a data transmission method thereof.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A communication apparatus which connects to a call connection server and a destination apparatus over an IP network, the communication apparatus comprising:
   a call controller that exchanges SIP messages with the destination apparatus via the call connection server;
   a memory that stores data files; and
   a file transferer that transfers the data files to the destination apparatus,
   wherein after the file transferer transfers a first data file to the destination apparatus, the call controller transmits an SIP message to the destination apparatus to initiate the transfer of a second data file, and
   when the call controller receives an SIP message from the destination apparatus which includes wait instruction information, the file transferer waits for a time period specified by the wait instruction information, and then re-transmits the SIP message to the destination apparatus to initiate the transfer of the second data file.

2. The communication apparatus according to claim 1, wherein the call controller transmits, to the destination apparatus, an INVITE message which includes file transfer capability information.

3. The communication apparatus according to claim 2, wherein the call controller transmits to the destination apparatus, a re-INVITE message which includes file information on a data file which is to be transferred.

4. The communication apparatus according to claim 3, wherein the file information contains a file name and file size of the data file to be transferred.

5. The communication apparatus according to claim 1, wherein the data files each contain image data corresponding to one page of a document; and
   the file transferer transfers the data files individually.

6. A communication apparatus which connects to a call connection server and a destination apparatus over an IP network, the communication apparatus comprising:
   a call controller that exchanges SIP messages with the destination apparatus via the call connection server; and
   a file transferer that transfers data files to the destination apparatus,
   wherein the call controller transmits, to the destination apparatus, an INVITE message which includes file transfer capability information, and transmits to the destination apparatus, a re-INVITE message which includes file information on a first data file which is to be transferred, when a response to the INVITE message from the destination apparatus indicates that the destination apparatus has file transfer capability
   the file transferer transfers the first data file, when information indicating reception capability is received from the destination apparatus as a response to the re-INVITE message,
   after the file transferer transfers the first data file to the destination apparatus, the call controller transmits an SIP message to the destination apparatus to initiate the transfer of a second data file, and
   when the call controller receives an SIP message from the destination apparatus which includes wait instruction information, the file transferer waits for a time period specified by the wait instruction information, and then re-transmits the SIP message to the destination apparatus to initiate the transfer of the second data file.

7. A data transmission method performed by a communication apparatus which connects to a call connection server and a destination apparatus over an IP network, the method comprising:
   transferring a first data file to the destination apparatus;
   transmitting an SIP message to the destination apparatus to initiate the transfer of a second data file;
   receiving an SIP message from the destination apparatus which includes wait instruction information;
   waiting for a time period specified by the wait instruction information; and
   after the time period has expired, re-transmitting the SIP message to the destination apparatus to initiate the transfer of the second data file.

8. A data transmission method performed by a communication apparatus which connects to a call connection server and a destination apparatus over an IP network, the method comprising:

transmitting, to the destination apparatus, an INVITE message which includes file transfer capability information;
transmitting, to the destination apparatus, a re-INVITE message which includes file information on a first data file, when a response to the INVITE message from the destination apparatus indicates that the destination apparatus has file transfer capability;
transferring the first data file to the destination apparatus, when information indicating reception capability is received from the destination apparatus as a response to the re-INVITE message;

transmitting an SIP message to the destination apparatus to initiate the transfer of a second data file;
receiving an SIP message from the destination apparatus which includes wait instruction information;
waiting for a time period specified by the wait instruction information; and
after the time period has expired, re-transmitting the SIP message to the destination apparatus to initiate the transfer of the second data file.

* * * * *